Feb. 16, 1932.   B. B. HARDING   1,845,410
CATALOGUING DEVICE
Filed July 26, 1927   2 Sheets-Sheet 2
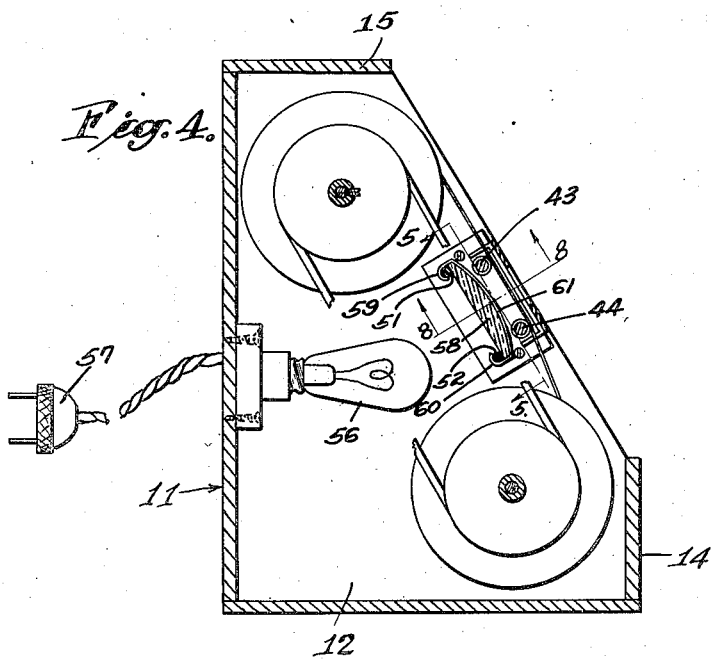
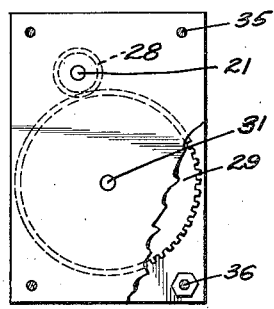
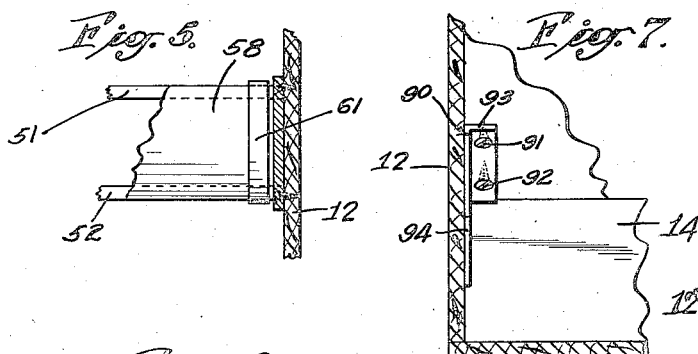
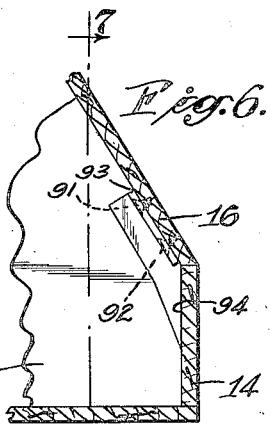
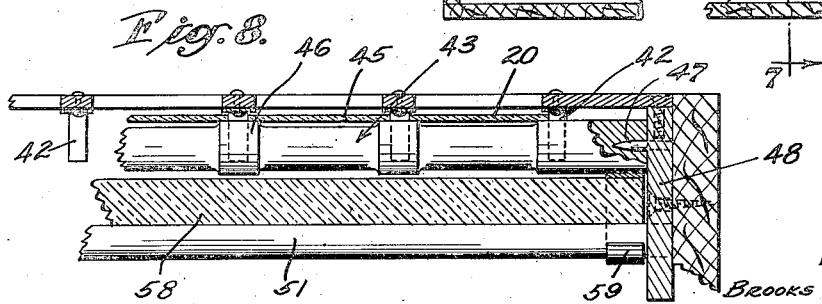
INVENTOR.
BROOKS B. HARDING
BY
ATTORNEY.

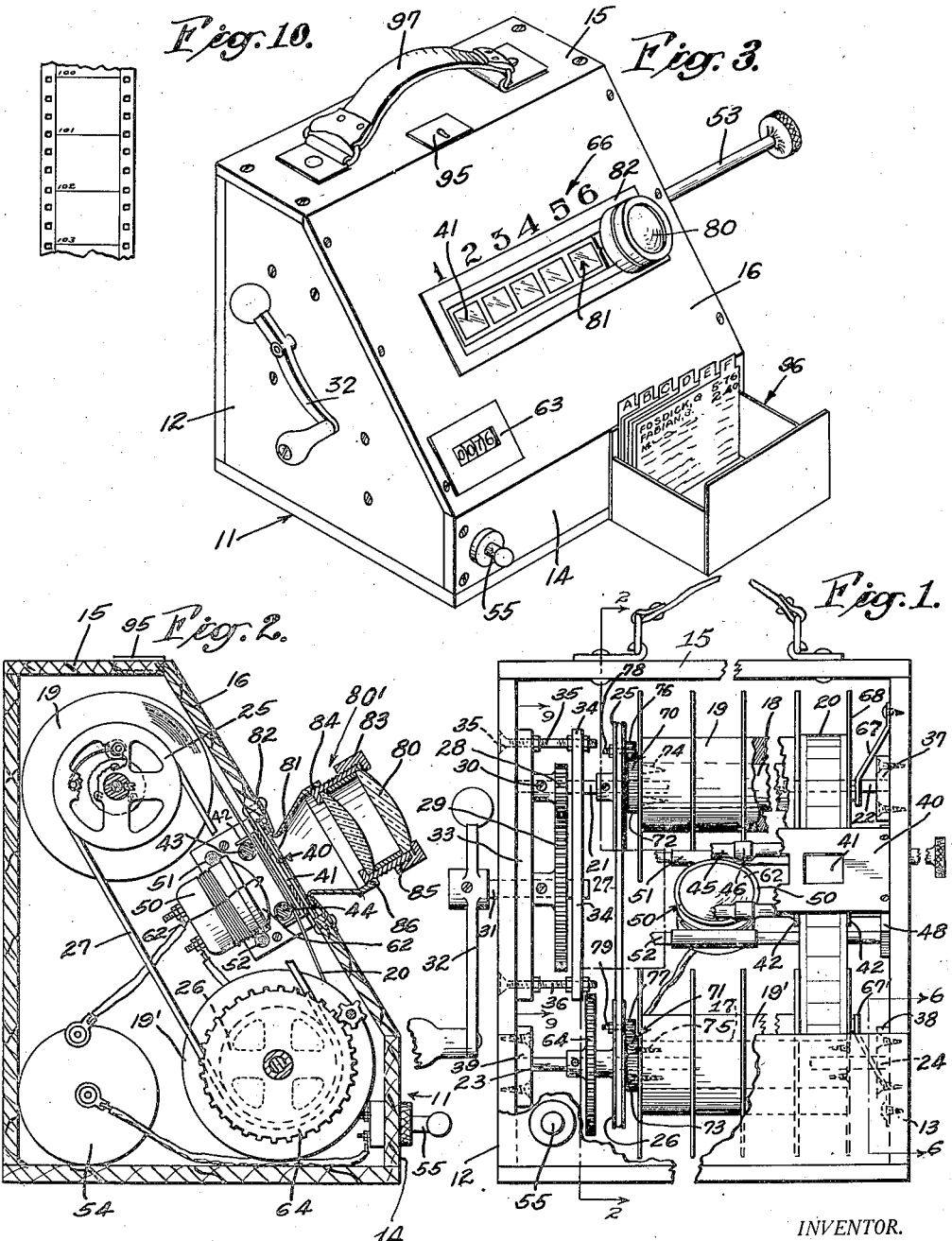

Patented Feb. 16, 1932

1,845,410

UNITED STATES PATENT OFFICE

BROOKS B. HARDING, OF LOS ANGELES, CALIFORNIA, ASSIGNOR TO GEORGE L. BROWN, OF LOS ANGELES, CALIFORNIA

CATALOGUING DEVICE

Application filed July 26, 1927. Serial No. 208,537.

My invention relates to an organization for cataloguing photographs or the like and is especially adapted for use in the filing and selection of casts in the filming of motion pictures, and in the filing of criminal records, etc. It is a device in which great numbers of miniature photographic or similar "subjects" may be compactly arranged in a small unit, and in which any individual subject may be readily identified and located. At the present time there is no satisfactory method whereby the casting director may rapidly and efficiently pick out actors to play the characters which he desires to fill certain parts in a picture which is to be produced. In choosing these actors comprising the cast it has been necessary to make a preliminary choice from photographs which are kept in files listed according to the part which the actors customarily play or from so called film catalogues which can accommodate only a relatively small percentage of available material from which the director would wish to choose. The use of ordinary photographs or cuts in film catalogues as a basis for selection, besides being clumsy, presents another difficulty in that they do not show what results the director can expect from an actual film test, in view of the fact that they have probably been retouched to present a more desirable appearance of the actor, consequently it is the custom, after making the preliminary decision, to obtain motion picture film showing the actors chosen, either from suitable files, if any, or by means of screen tests.

It is an object of my invention to produce means whereby a comparatively unlimited number of actual moving picture film photographs or other miniature images may be compactly arranged upon single reels of film in an organization in which they may be viewed as they would actually appear upon the screen, preferably a plurality of frames showing different views of each actor. These photographs, which have been excerpted from reels of films showing the action of the actor, that are readily available, if further investigation is desired, are accompanied by a title frame on which the name of the actor and any other desirable data, such as reference to the mentioned film, may be placed. In cooperation with this organization I employ an indicator and a corresponding index, by means of which any desired photograph or frame may be conveniently and readily located.

Further fundamental objects of my invention are to obviate the necessity of having to search through awkward and cumbersome files containing photographs of the actors or to use the somewhat unsatisfactory method of having to search through a catalogue, and to obviate the possibility of having to select a cast from retouched photographs which must necessitate the additional use of screen tests, and to provide a method of indexing the files of motion picture film, whereby an actual frame from the film gives a view of the character shown in same.

Other objects of my invention will appear from a description of the illustrative embodiment of same shown in the accompanying drawings in which—

Fig. 1 is a front view, showing parts broken away.

Fig. 2 is a sectional elevation taken substantially along the line 2—2 of Fig. 1.

Fig. 3 is a perspective assembly view.

Fig. 4 is a sectional elevation with parts removed, showing a modified form of my invention.

Fig. 5 is a partial sectional view, taken along line 5—5 of Fig. 4.

Fig. 6 is a partial sectional view along the line 6—6 of Fig. 1.

Fig. 7 is a partial sectional view on the line 7—7 of Fig. 6.

Fig. 8 is a partial sectional view along the line 8—8 of Fig. 4.

Fig. 9 is a partial sectional view along the line 9—9 of Fig. 1 showing parts broken away.

Fig. 10 shows a type of film which may be used in my invention.

Referring to the details of that specific embodiment of my invention chosen for the purpose of illustration: 11 indicates a box or casing for the film and operating mechanism having sides 12 and 13 with vertical face member 14, a horizontal top 15, and an inclined removable cover 16. Mounted in the box are upper and lower shafts 17 and 18 respectively, carrying reels 19 and 19', the reels in turn carrying film 20. These shafts 17 and 18 are rotatably mounted upon bearing shafts 21, 22, 23 and 24. The rotation of the shafts 17 and 18 is effected through the pulleys 25 and 26, which are inter-connected by a belt 27, the upper pulley 25 being mounted upon the upper shaft 21, which is rotated by means of gears 28 and 29. The smaller gear 28 is secured to the shaft 21 by means of such as a screw 30, and the larger gear 29 is mounted upon a shaft 31, which carries operating means such as a crank 32. The gears 28 and 29 are mounted between plate members 33 and 34, which are secured with relation to each other by means such as bolts 35 and 36. These gears may be designed to give any convenient speed ratio between the crank 32 and the reels 19—19', and for the purpose of my invention I find a diameter ratio of about 4 to 1 very satisfactory. The bearing shaft 21 passes through the plate 34 and is rotatably mounted in the outer plate 33. The bearing shafts 22, 23 and 24 are rotatably mounted in the bearing plates 37, 38 and 39, which are secured to the sides 12 and 13 of the box by means such as screws.

40 indicates a plate which has rectangular observation apertures 41 therein, corresponding in size to one of the frames carried by the film. The film 20 is supported and advanced by means of the reels 19—19' past the observation apertures 41 and is retained against transverse movement by means of lugs 42, which are secured to the plate 40. The film is held in position relative to the plate by means such as rollers 43 and 44 which have grooved surfaces 45 and film engaging shoulders 46 to prevent the scratching of the film frames. These rolls rotate on bearing pins 47 which are mounted in plate members 34 and 48, the latter being secured to the side 13 of the box.

In order that the film frames or subjects may be rendered visible, I use a light 50 which may be slidably mounted behind the film 20 on the rods 51 and 52. This light is adjustable by means of the extending rod 53 to render any one of the desired films visible at any time. The current to the light may be supplied by means such as a battery 54 which is connected through the switch 55 to the light 50, or in the modified form of my invention shown in Fig. 4, a light 56 may be directly connected to the house circuit by means such as a plug 57, in which case it is necessary to employ a ground glass 58, which is secured behind the rolls 43 and 44 by being mounted upon the rods 51 and 52 by means such as hooks 59 and 60 on a clip 61. In case the light 50 is used, it is equipped with a lens 62 which is made of ground glass.

In order that any desired frame or subject on the strip of film may be immediately located, I employ "subject indicating means" such as a cyclometer 63 which is mounted in the cover member 16 and operated by a gear 64 mounted upon the shaft 23. The ratio of the cyclometer 63 to the gear 64 is such that the cyclometer reading corresponds to the frame or subject numbers upon the films 20 opposite the apertured plate or observation means 40. While I have referred to individual numbers on the frames or subjects on the films, it is to be understood that such numbering is not necessary as the film is so placed on the rolls that the position of the different subjects corresponds to the cyclometer reading. The film reels are identified by any suitable "roll identifying means," such as a number system 66 placed on the cover 16 above the apertured plate 40.

In order that the films 20 may be kept tight at all times I employ an organization consisting of the brake members 67 and 67' secured to the side 13 of the box 11 and contacting with the outer faces 68 and 69 of the reels 19 and 19'. Film ratchet organizations 70 and 71 are mounted between the pulleys 25 and 26 and the shafts 17 and 18, and shafts 17 and 18 are rotated in one direction only by means of the ratchet organizations 70 and 71. The ratchet organizations consist of main ratchet wheels 72 and 73 mounted upon the shafts 17 and 18 by means such as screws 74 and 75, and cylindrical pawls 76 and 77 mounted upon the pulleys 25 and 26 by means such as bolts 78 and 79. Thus, when the speed ratio between the rolls is altered due to the increase in diameter of one roll, resulting from that roll carrying the majority of film, one of the ratchets will slip. In case the operation is being carried out in the opposite direction, the belt will slip.

80 indicates a lens mounted in a housing 80' which is slidably supported upon the cover member 16 over a glass cover 81 and is retained thereon by means of a rectangularly apertured plate 82. This lens 80 is so mounted in housing 80' embodying the lens carrying members 83 and 84 that it may be adjusted through rotation in threads 85 and 86 to place the frame or subject in a focus, depending upon the observer.

The cover 16 is provided with a novel locking means which consists of an angle plate 90 mounted beneath the lower portion of the cover 16 by means of screws 91 and 92 through the cover engaging flange 93. The angle plate 90 has a substantially vertical engaging surface 94 adapted to engage the vertical face member 14. An ordinary key lock 95, mounted in the horizontal top member 15, engages the cover member 16 in place.

96 indicates an index which may optionally be mounted upon the face member 14, or may comprise a separate book, and in which the numbers correspond respectively to the roll of film, indicated by the reel identifying numbers 66 upon the cover 16, and the frame or subject number as indicated by the reading on the cyclometer 63.

In the form of my invention shown in Figures 1 to 3, inclusive, I provide a handle 97 which is mounted upon the horizontal top member 15 by means of which the device is rendered portable.

The operation of my invention is somewhat as follows: Assuming that reels 19 and 19' are all provided with picture carrying film and it is desired to locate the picture of a character, such as G. Fabian, the index 96 is consulted and upon finding that G. Fabian is on the second roll of film and the fortieth subject thereon, the light 50 is turned on by operation of the switch 55, and is adjusted by means of the rod 53 to illuminate the frame indicated by the numeral 2 upon the cover member. The lens 80 is correspondingly moved to cover this frame, and the crank 32 is rotated until the numeral 40 appears upon the cyclometer indicator 63. The frame or subject 40 (or set of frames indicated at this numeral) which is then visible through the lens carries a miniature photograph of the character indicated, to which the light, the ground glass and the lens combine to give an appearance similar to that which would be obtained by focusing same upon a screen. The frame immediately following the picture may be used to provide the character's name and any additional data which may be desired.

The film 20 may carry any desired number of pictures of the character in different poses, in which case the cyclometer ratio would necessarily be altered accordingly, and the films and characters may be indexed and cross-indexed in any desired manner, which will be readily apparent to those familiar with the art. It might be stated that in the type of my invention shown, about two thousand characters may be conveniently illustrated, the illustrations being exact reproduction of their screen appearance, which is obviously a great improvement over any of the aforementioned methods. It will further be noted that a slight enlargement of the cabinet would greatly increase the capacity if such were desired.

The film may be prepared in any manner readily apparent to those familiar with the art, such as splicing and reprinting, or simply splicing. I prefer to use the former method, leaving ample space of blank film between frames for insertion of new pictures, without overlapping the frames carrying pictures.

The use of my invention need not be confined to the motion picture industry, since it may obviously be used any place where it is desired to keep voluminous data catalogued in a compact form, and the film may be replaced by any type of transparent or other strip upon which data may be printed in minute type.

Although I have herein described alternative complete embodiments of my invention, it should be understood that various features thereof might be independently employed, and also that additional modifications might easily be devised by those skilled in the art, without the slightest departure from the spirit and scope of my invention as same is indicated above and in the following claims.

I claim as my invention:

1. An organization of the class described, comprising: a casing having an aperture therein; a plurality of rolls of film in said casing having a plurality of subjects on each film adapted to register with said aperture; roll identifying means on said casing; subject identifying means on said film; and subject indicating means cooperative with all of said rolls.

2. An organization of the class described, comprising: a casing having an aperture therein; a plurality of rolls of film in said casing having a plurality of subjects on each film adapted to register with said aperture; roll identifying means on said casing; subject identifying means on said film; subject indicating means cooperative with all of said rolls; and means for optionally rendering any one of said subjects visible.

3. An organization of the class described, comprising: a casing having an aperture therein; a plurality of rolls of film in said casing having a plurality of subjects on each film adapted to register with said aperture; roll identifying means on said casing; subject identifying means on said film; subject indicating means cooperative with all of said rolls; and means for maintaining said films in tight engagement with said rolls.

4. An organization of the class described, comprising: a casing having an aperture therein; a plurality of rolls of film in said casing, each film having a plurality of subjects thereon; said rolls being arranged to register individual subjects with said aperture upon rotation; roll identifying means; subject identifying means; subject indicating means cooperative with all of said rolls; illuminating means for optionally rendering individual subjects visible; and means for magnifying said visible subject.

5. A motion picture cast selector, comprising: a casing having an aperture therein; a plurality of rolls of film carrying individual sets of subjects mounted in said casing; means for cooperatively rotating said rolls to bring individual subjects into registration with said aperture; subject indicating means cooperatively operable by said rotating means; roll identifying means on said casing; subject identifying means in said film; and means rendering said located subject visible.

6. An organization of the class described comprising: a casing; a plurality of rolls consisting of flexible strips carrying subjects mounted in said casing; said casing being provided with roll identifying means, and said film being provided with subject identifying means; means for rotating said rolls; and subject indicating means operable by said rotating means and cooperative with all of said rolls.

7. An organization of the class described comprising: a casing; a plurality of rolls consisting of flexible strips carrying subjects mounted in said casing; said casing being provided with roll identifying means, and said film being provided with subject identifying means; means for rotating said rolls; subject indicating means operable by said rotating means and cooperative with all of said rolls; and means for rendering said located subjects on said strips visible.

8. An organization of the class described comprising: a casing; a plurality of rolls consisting of flexible strips carrying subjects mounted in said casing; said casing being provided with roll identifying means, and said film being provided with subject identifying means; means for rotating said rolls; subject indicating means operable by said rotating means and cooperative with all of said rolls; means for rendering said located subjects on said strips visible; and means for magnifying said visible subjects.

9. An organization of the class described comprising: motion picture film composed of frames carrying individual sets of subjects and mounted in a casing; indicating means operable during the movement of said film and cooperative with said frames; means including a light and a lens for observing an indicated frame and means for optionally positioning any one of said frames opposite said observation means.

10. A device for locating filed reels of motion picture film comprising: motion picture film composed of individual frames from said filed film with cooperating frames carrying identifying matter mounted in a casing; indicating means cooperatively mounted in said casing for indicating the position of said frames; means for observing indicated frames; and means for illuminating said observed frames.

11. An organization of the class described, comprising: a casing; shaft members mounted in said casing; rolls mounted on said shaft members; means for rotating said rolls; subject carrying films mounted on said rolls; observation means comprising an apertured plate mounted over said films; a lamp mounted beneath said film, adapted to project light through subjects opposite said aperatures; a removable cover member mounted above said casing, having an opening therein positioned above said apertured plate; a lens slidably mounted in said cover member opening for producing a magnified image of an observed subject; and an indicator mounted in said cover operable by said roll rotating means to indicate the position of said subjects relative to said observation means.

12. An organization of the class described, comprising: a casing; shaft members mounted in said casing; rolls mounted on said shaft members; means for rotating said rolls; subject carrying films mounted on said rolls; an apertured plate mounted over said films through the apertures of which said subjects are visible; a lamp mounted beneath said film, adapted to project light through said visible subjects; a removable cover member mounted above said casing, having an opening therein positioned above said apertured plate; a lens slidably mounted in said cover member opening; and a cyclometer mounted in said cover, operable by said roll rotating means and adapted to indicate the position of said visible subjects relative with said film.

13. An organization of the class described, embodying: a casing; a plurality of rolls of films rotatably mounted in said casing, each having subjects thereon; means for observing said subjects; means for supporting and advancing said films before said observation means; and an indicator operable during the movement of said film for indicating the position of subjects on said films, relative to said observation means, said casing being provided with means for identifying said rolls.

14. An organization of the class described, embodying: a film having a plurality of subjects thereon; means for observing a part of said film; means for supporting and advancing said film before said observation means; an indicator operable during the movement of said film for identifying a subject which is opposite said observation means; means for illuminating a subject opposite said observation means and means for producing a magnified image of said illuminated subject.

15. An organization of the class described embodying: a film having a plurality of subjects thereon; means for observing a part of said film; means for supporting and advancing said film before said observation means, and an indicator operable during the movement of said film for identifying a subject which is opposite said observation means, and means for illuminating a subject opposite said observation means.

16. A cataloguing device embodying: a film rotatably mounted in a casing and carrying a plurality of subjects; means for observing said subjects; means for illuminating said subjects; and means for positioning an identified subject opposite said observation means.

17. An organization of the class described comprising: a casing; shafts mounted in said casing; rolls mounted on said shafts; means for rotating said rolls; films carrying subjects mounted on said rolls; subject observation means mounted over said films; means for illuminating said film; a cover member on said casing having roll identifying means thereon, and an opening therein above said subject observation means, and an indicator operable by said roll rotating means for indicating a subject opposite said observation means.

18. A cataloguing device comprising a casing; shafts mounted in said casing; rolls mounted on said shafts; means for rotating said rolls; films, carrying subjects mounted on said rolls; subject observation means mounted over said films; means for illuminating said films; a cover member on said casing having roll identifying means thereon, an opening therein above said subject observation means; and an indicator operable by said roll rotating means for indicating a subject opposite said observation means.

19. An organization of the class described comprising: a casing having an aperture therein; a plurality of rolls of films in said casing, said films having a plurality of subjects thereon adapted to pass beneath said aperture; roll identifying means on said casing; means cooperating with all of said rolls for indicating the individual subject on a film exposed through said aperture upon rotation of said rolls.

20. An organization of the class described comprising: a casing having an aperture therein; a plurality of rolls of films in said casing, said films having a plurality of subjects thereon adapted to pass beneath said aperture; illuminating means cooperating with said films and said aperture to render visible the subject exposed on each film; roll identifying means on said casing; means cooperating with all of said rolls for indicating the subject on a film exposed through said aperture upon rotation of said rolls.

21. An organization of the class described comprising: a casing having an aperture therein; a lens mounted over said aperture; a plurality of rolls of films in said casing, said films having a plurality of subjects thereon adapted to pass beneath said aperture; illuminating means cooperating with all of said films and said lens to project an image of the subject exposed on each film through said aperture and lens.

22. An organization of the class described comprising: a casing having an aperture therein; a lens slidably mounted over said aperture; a plurality of rolls of films in said casing, said films having a plurality of subjects thereon adapted to pass beneath said aperture; illuminating means cooperating with all of said films and said lens to project an image of the subject exposed on a film through said aperture.

In testimony whereof, I have hereunto set my hand at Los Angeles, California, this 20th day of July, 1927.

BROOKS B. HARDING.